Patented Apr. 17, 1923.

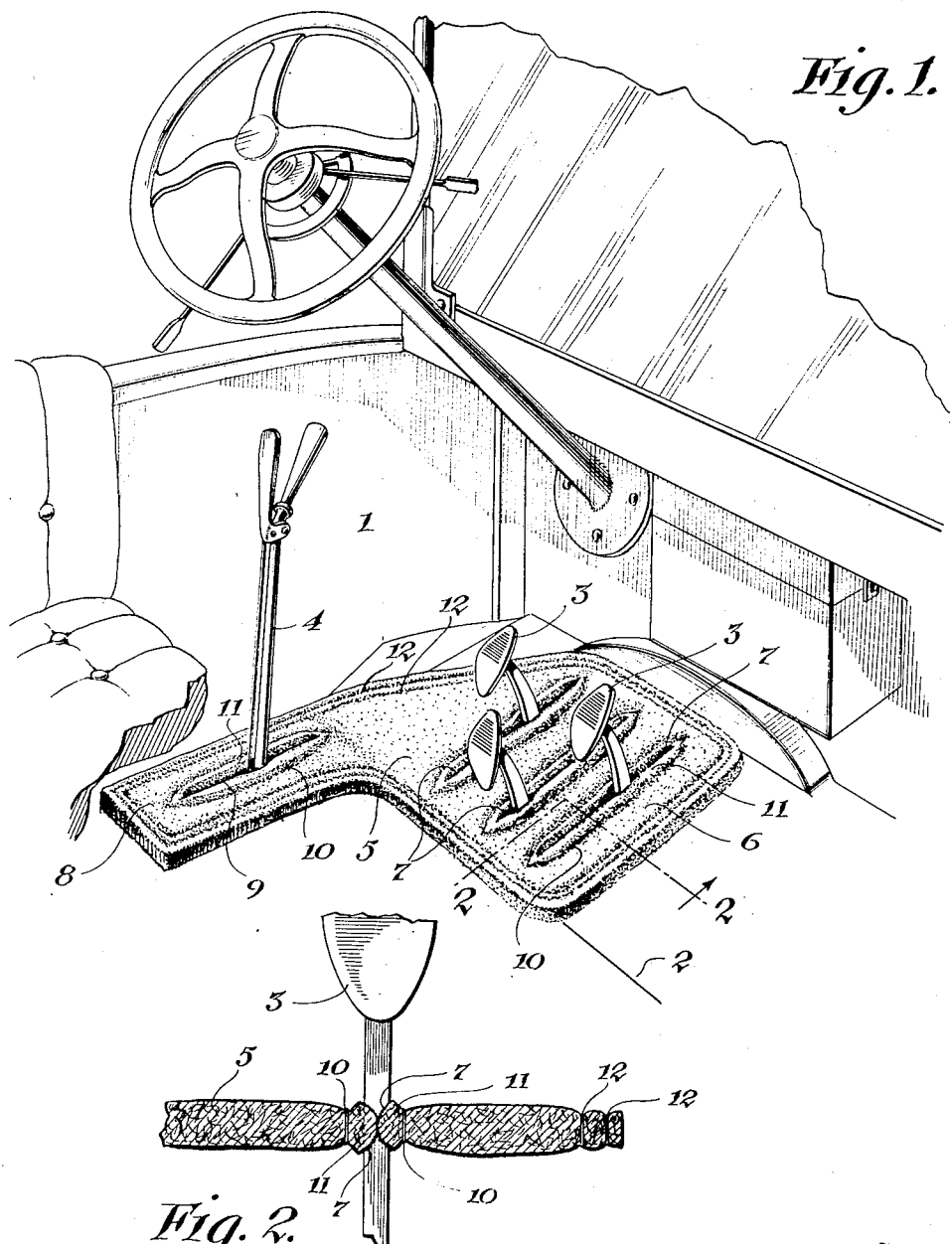

1,451,987

UNITED STATES PATENT OFFICE.

ANDREW S. KINNEY, OF REDWOOD FALLS, MINNESOTA.

SLOT-CLOSURE MAT FOR AUTOMOBILES.

Application filed July 13, 1922. Serial No. 574,832.

*To all whom it may concern:*

Be it known that I, ANDREW S. KINNEY, a citizen of the United States, and a resident of Redwood Falls, in the county of Redwood and State of Minnesota, have invented certain new and useful Improvements in Slot-Closure Mats for Automobiles, of which the following is a full, clear, and exact description.

My invention relates to improvements in slot-closure mats for automobiles, and one of the objects of the invention is to provide a mat of this character which will effectively prevent the entrance into the body of the car, of heated air in the summer time, cold air in the winter time, and dust, dirt, grease, etc., at all times.

Another object of the invention resides in the provision of a mat of this character which is made of felt or similar material, and which is stitched adjacent the slots therein, thereby causing bulged or swelled edges which normally meet and effectively seal the slots. Further, the swelled edging is elastic or springy, and therefore will retain its function as an effective seal for a long period, even though the wear may be considerable.

A further object of the invention is to provide such a mat, which though not limited to use with Ford automobiles, is particularly adapted thereto; and which has provided in a single piece of material three slots for the control pedals, and another slot for the emergency brake lever.

Other objects of the invention reside in the provision of a mat of this character which may be readily mounted in position or removed therefrom, and which does not require the use of any securing means; and which is simple in construction, inexpensive in manufacture, and durable in operation.

For a detailed description of the invention reference is to be had to the accompanying drawings; in which, Figure 1 is a perspective view of a portion of the interior of a Ford automobile, and showing the mat mounted therein; the ordinary rubber mat being removed so that the slot closure mat will be visible; and Figure 2 is a vertical sectional view of a portion of the mat; the section being taken on line 2—2 of Figure 1.

Referring to the drawings more in detail, the numeral 1 indicates generally the body of a Ford automobile, having the floor 2; the floor being provided with the usual slots through which extend the foot pedals 3, and the emergency brake lever 4. The mat is indicated generally by numeral 5 and is shown in operative position on the floor. In the preferred arrangement the mat 5 will be positioned under the ordinary rubber floor mat, but in order that the invention may be more clearly shown, the rubber mat has been omitted from the drawings.

The mat 5 is preferably made of felt or a felt-like material, and consists of a forward body portion 6 provided with three slots 7, and a rearwardly extending leg 8 having a slot 9 for the reception of the brake lever 4.

The four slots are preferably formed by merely slitting the felt or felt-like material, and then forming a row of stitching entirely around the four slits. The rows of stitching are spaced somewhat from the edges of the fissures, and are indicated by numeral 10.

By stitching around the slits, the felt at the edges is forced into a puffed or swelled state as indicated by numeral 11. In this condition, the material forming the edges of the slits or slots, is highly elastic, and hence it will close around the levers arranged therein, and present an effective seal. As previously stated the rows of stitching 10, are spaced somewhat from the edges of the slots. Two advantageous results are produced by thus spacing the stitching from the edges. One advantage, mentioned above, is that a highly elastic, swelled or puffed edge is produced. Another advantage is, that by spacing the stitching the mat will stand a great amount of wear from the levers without losing its shape or effectiveness. Obviously, if the stitching should be arranged close to the edges of the slots, after some little wear the stitching would become worn and the effectiveness of the mat as a seal would be greatly impaired.

It is desirable that the mat be given sufficient body, so that it will lie flat against the floor, and will at all times retain its proper form and position. I have found that by forming a plurality of rows of stitching adjacent to the edge of the mat, and extending entirely around the same, that the mat will be given considerable stiffness, that the edges thereof will be substantially flat, and that the mat will thus be given sufficient body or stability to cause it to retain its shape and lie in the desired position. In the drawings I have shown two rows of stitching, indicated by numerals 12, 12; but it will be understood, of course, that the invention is not limited to any particular number of rows of stitching, either around the edge of the mat or around the slots formed therein.

It may be mentioned here that a mat formed of the material and in the manner described, has considerable thickness, and the walls of the slots have even more thickness because of the swelling previously mentioned; and obviously, the greater the thickness of the walls, the greater will be the effectiveness of the sealing action thereof.

From the foregoing detailed description it will be apparent that I have provided a mat of this character which is not only extremely simple and inexpensive, but also is highly efficient as a seal to prevent the entrance of hot or cold air, dust, grease, etc., and which for reasons indicated herein has great lasting quality.

It will be understood that the particular mat illustrated may be applied to any type of Ford automobile, and that by slight modification the mat may be adapted to the use of any automobile.

In accordance with the patent statutes I have described what I now believe to be the best embodiment of my invention, but I do not wish to be understood thereby as limiting myself or the scope of my invention, as various modifications may be made without departing from the spirit of the invention, and all such I aim to include in the scope of the appended claims.

What I claim as new and desire to secure by Letters Patent is:

1. A device of the character described including a mat of felt-like material, said mat provided with a slot therein adapted to receive a control lever for automobiles, the walls of said slot meeting to form a seal, and the material forming said walls having a swelled or puffed formation.

2. A device of the character described including a mat of felt-like material, said mat provided with a slot therein adapted to receive a control lever for automobiles, and a row of stitching extending around said slot, whereby the walls of the slot are given a swelled or puffed formation for the purpose specified.

3. A device of the character described including a mat of felt-like material, said mat provided with a slot therein adapted to receive a control lever for automobiles, a row of stitching extending around said slot and spaced from the edges thereof, whereby the walls of said slot have a swelled or puffed formation and possess a high degree of elasticity.

4. A device of the character described including a mat of felt-like material, said mat consisting of a forward body portion, and a rearwardly extending leg, said body portion having three slots formed therein for receiving the control pedals of an automobile, and the rearwardly extending leg having a slot provided therein for receiving the emergency brake lever, said mat formed of a single piece of material, and the walls of said slots having a swelled or puffed formation.

5. A device of the character described including a mat of felt-like material, said mat consisting of a forward body portion, and a rearwardly extending leg formed of a single piece of material, said mat provided with a plurality of slots for receiving the control levers of an automobile, the walls of said slots having a swelled or puffed formation, and one or more rows of stitching extending substantially entirely around the mat adjacent to the edges thereof, whereby the mat is considerably stiffened and the edges thereof flattened.

6. A device of the character described including a mat of felt-like material, said mat consisting of a forward body portion and a rearwardly extending leg formed of a single piece of material, said body portion having three slots therein for receiving the control pedals of an automobile, and the rearwardly extending leg having a slot provided therein for receiving the emergency brake, a row of stitching extending around said slots and spaced from the edges thereof, whereby the walls of said slots have a puffed or swelled formation, and one or more rows of stitching extending substantially entirely around the mat adjacent to the edges thereof, whereby the mat is considerably stiffened and the edges thereof flattened.

ANDREW S. KINNEY.